3,426,036
N-(p-PHENOXYBENZOYL-LOWER ALKYL)-4-PHENYL-TETRAHYDROPYRIDYL DERIVATIVES; THE CORRESPONDING ALCOHOL, CARBAMATE AND LOWER ALKYLENE DERIVATIVES

John H. Biel and Harvey B. Hopps, Milwaukee, Wis., assignors to Aldrich Chemical Company, Milwaukee, Wis., a corporation of Wisconsin
No Drawing. Filed Aug. 4, 1966, Ser. No. 570,186
U.S. Cl. 260—297          7 Claims
Int. Cl. A61k 27/00; C07d 27/00, 29/00

This invention relates to novel compounds. More particularly, this invention relates to novel compounds which possess valuable therapeutic utility as muscle relaxants and to processes useful in the preparation thereof. In another aspect, this invention relates to a novel method of producing muscle relaxation in mammals.

It is an object of this invention to provide a new class of therapeutic compounds. It is another object of the present invention to provide novel compounds having muscle relaxant activity. It is a further object of the present invention to provide a process for preparing the novel therapeutic compounds. It is a still further object of the present invention to provide a novel method of producing muscle relaxation in mammals.

These and other objects which may appear as the specification proceeds are achieved by this invention which comprises the provision of compounds having the following formula (1) 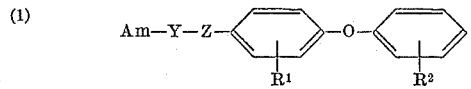

wherein:

R$^1$ and R$^2$ each represent a member selected from the group consisting of hydrogen, chloro, bromo, iodo, fluoro, trifluoromethyl, lower alkyl, lower alkoxy, methylenedioxy, nitro and amino;
Am is a member selected from the group consisting of

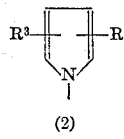  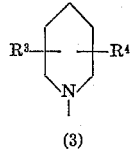  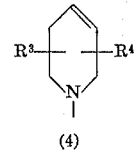
(2)            (3)            (4)

and

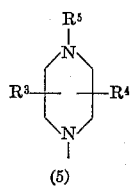
(5)

wherein R$^3$ and R$^4$ each represent a member selected from the group consisting of hydrogen, lower alkyl, hydroxy, lowr alkynyl, lower alkoxy carbonyl, cycloalkyl radicals having from 3 to 7 carbon atoms, inclusive, e.g. cyclopropyl, cyclopentyl, cyclohexyl and cycloheptyl, phenyl, halophenyl, e.g. chlorophenyl, bromophenyl, iodophenyl and fluorophenyl, trifluoromethylphenyl, lower alkoxy phenyl and lower alkyl phenyl; R$^5$ is a member selected from the group consisting of lower alkyl, phenyl, halophenyl, lower alkoxy phenyl, trifluoromethylphenyl and lower alkyl phenyl;
Y is lower alkylene; and
Z is a member selected from the group consisting of

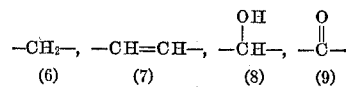

and

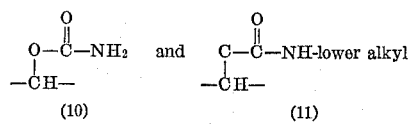

and the pharmaceutically acceptable nontoxic salts thereof.

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric, cyclohexylsulfamic, naphthalenesulfonic, methane sulfonic and the like.

The term "lower alkyl" as used herein means both straight and branched chain aliphatic hydrocarbon radicals containing from 1 to 8 carbon atoms, e.g. methyl, ethyl, propyl, isopropyl, butyl, isobutyl, t-butyl, amyl, hexyl, 2-ethylhexyl, octyl, etc.

The term "lower alkynyl" as used herein means both straight and branched chain alkynyl radicals containing from 2 to 8 carbon atoms, e.g. ethinyl, propargyl, 1-butinyl, 2-butinyl, 1,1-dimethylpropargyl, 1-pentinyl, 1-heptinyl, etc.

The term "lower alkylene" as used herein means both straight and branched chain alkylene radicals containing from 1 to 5 carbon atoms, e.g. methylene, ethylene, octylene, propylene, butylene, isobutylene, t-butylene, amylene, hexylene, 2-ethylhexylene, etc.

Similarly, where the term "lower" is used as part of the description of another group, e.g., "lower alkoxy," it refers to the alkyl portion of such group which is therefore as described in connection with "lower alkyl."

Thus, the compounds of the present invention have the following formulae:

(12) 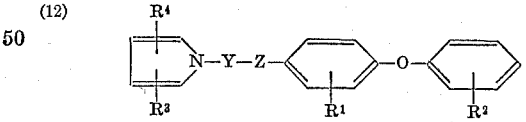

(13) 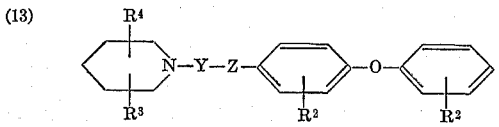

(14) 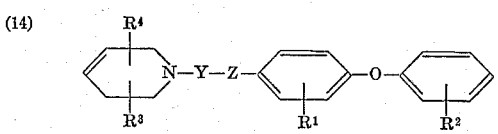

(15) 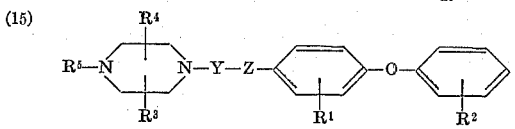

wherein R$^1$, R$^2$, R$^3$, R$^4$, R$^5$, Y and Z are as described above.

A preferred group of compounds of this invention are those of the formula

(16)
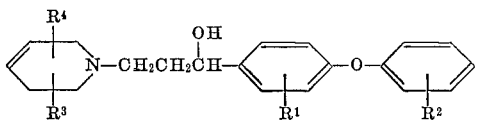

wherein $R^1$, $R^2$, $R^3$ and $R^4$ are as described above.

The compounds of this invention are prepared according to the following procedure which consists of reacting a diphenylether of the formula

(17)
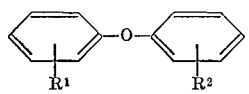

wherein $R^1$ and $R^2$ are as described above with a halo acid halide of the formula

(18)
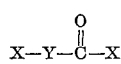

wherein X is chloro, bromo or iodo, in the presence of a Lewis acid, e.g., aluminum chloride and boron trifluoride and preferably in an inert solvent such as benzene and at room temperature to produce a halo alkyl ketone of the formula

(19)
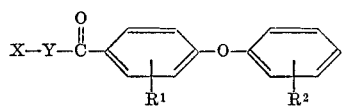

wherein X, Y, $R^1$ and $R^2$ are as described above. The foregoing method is described by C. Allen, H. W. Crossman and A. C. Bell, Can. J. Res. 8, 440 (1933).

Some of the halo alkyl ketones which may be produced in this manner are:
α-chloro n-phenoxyacetophenone,
α-chloro p-phenoxybutyrophenone,
β-chloro p-phenoxypropiophenone,
γ-chloro p-phenoxybutyrophenone,
β-chloro p-(4-fluorophenoxy)propiophenone,
γ-chloro p-(4-fluorophenoxy)butyrophenone,
γ-chloro p-(3-trifluoromethylphenoxy)butyrophenone,
β-bromo p-(2-chlorophenoxy)propiophenone,
β-chloro p-(2-methoxyphenoxy)propiophenone,
β-bromo m-trifluoromethyl-p-phenoxypropiophenone,
β-chloro m-fluoro-p-phenoxypropiophenone,
β-chloro o-fluoro-p-phenoxypropiophenone,
β-bromo o-methoxy-p-(4-fluorophenoxy)propiophenone and
γ-chloro m-fluoro-p-(3-trifluoromethylphenoxy)-propiophenone.

Aminolysis of the halo alkyl ketone of formula 19 with a heterocyclic amine of the formula

(20)        AmH wherein Am is as described above, in the presence of an inert solvent such as benzene, toluene, dimethylformamide, dimethylsulfoxide and an acid acceptor such as potassium carbonate, sodium carbonate, aminopyrine, triethylamine, produces the amino ketone having the formula

(21)
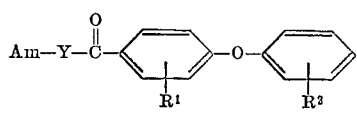

wherein Am, Y, $R^1$ and $R^2$ are as described above. The reaction is preferably carried out at elevated temperature, e.g. 70° C.

Some of the amino ketones obtained in this manner are:
α-pyrrolidino p-phenoxyacetophenone,
α-piperidino p-phenoxyacetophenone,
α-(4-methylpiperazino) p-phenoxyacetophenone,
α-(4-phenylpiperazino) p-phenoxyacetophenone,
α-(4-phenylpiperidino) p-phenoxyacetophenone,
α-(4-phenyl-1,2,5,6-tetrahydropyridino) p-phenoxyacetophenone,
α-(4-hydroxypiperidino) p-phenoxyacetophenone,
α-(4-propinyl-4-hydroxypiperidino) p-phenoxyacetophenone,
α-(4-cyclopropyl-4-hydroxypiperidina) p-phenoxyacetophenone,
α-(4-m-trifluoromethylphenyl - 1,2,5,6 - tetrahydropyridino) p-phenoxyacetophenone,
α-[4-(o-methoxyphenyl)piperazino] p-phenoxyacetophenone,
α-(4-phenyl-4-carbethoxypiperidino) p - phenoxyacetophenone,
β-pyrrolidino p-phenoxypropiophenone,
β-piperidino p-phenoxypropiophenone,
β-(4-methylpiperazino) p-phenoxypropiophenone,
β-(4-phenylpiperazino) p-phenoxypropiophenone,
β-(4-phenylpiperidino) p-phenoxypropiophenone,
β-(4-phenyl-1,2,5,6-tetrahydropyridino) p - phenoxypropiophenone,
β-(4-hydroxypiperidino) p-phenoxypropiophenone,
β-(4-propinyl-4-hydroxypiperidino) p - phenoxypropiophenone,
β-(4-cyclopropyl-4-hydroxypiperidino) p - phenoxypropiophenone,
β-(4-m-trifluoromethylphenyl - 1,2,5,6 - tetrahydropyridino) p-phenoxypropiophenone,
β-[4-(o-methoxyphenyl)piperazino] p - phenoxypropiophenone,
β-(4-phenyl-4-carbethoxypiperidino) p - phenoxypropiophenone,
β-(4-phenyl-1,2,5,6-tetrahydropyridino) p-(4-fluorophenoxy)-propiophenone,
β-(4-phenyl-1,2,5,6-tetrahydropyridino) p - (3-trifluoromethylphenoxy)propiophenone,
β-(4-phenyl - 1,2,5,6 - tetrahydropyridino) p-(2-chlorophenoxy)propiophenone,
β-(4-phenyl - 1,2,5,6 - tetrahydropyridino) m-trifluoromethyl-p-phenoxypropiophenone,
β-(4-phenyl - 1,2,5,6 - tetrahydropyridino) m-fluoro-p-phenoxypropiophenone,
β-(4-phenyl-1,2,5,6-tetrahydropyridino) m - fluoro-p-(3-trifluoromethylphenoxy)propiophenone,
γ-pyrrolidino p-phenoxybutyrophenone,
γ-piperidino p-phenoxybutyrophenone,
γ-(4-methylpiperazino) p-phenoxybutyrophenone,
γ-(4-phenylpiperazino) p-phenoxybutyrophenone,
γ-(4-phenylpiperidino) p-phenoxybutyrophenone,
γ-(4-phenyl-1,2,5,6-tetrahydropyridino) p-phenoxybutyrophenone,
γ-(4-hydroxypiperidino) p-phenoxybutyrophenone,
γ-(4-propinyl-4-hydroxypiperidino) p - phenoxybutyrophenone,
γ-(4-cyclopropyl-4-hydroxypiperidino) p - phenoxybutyrophenone,
γ-(4-m-trifluoromethylphenyl - 1,2,5,6 - tetrahydropyridino) p-phenoxybutyrophenone,
γ-[4-(o-methoxyphenyl)piperazino] p - phenoxybutyrophenone,
γ-(4-phenyl-4-carbethoxypiperidino) p - phenoxybutyrophenone,
γ-(4-phenyl - 1,2,5,6 - tetrahydropyridino) p-(4-fluorophenoxy)butyrophenone,
γ-(4-phenyl - 1,2,5,6 - tetrahydropyridino) p-(3-trifluoromethylphenoxy)butyrophenone,
γ-(-phenyl - 1,2,5,6 - tetrahydropyridino) p-(2-chlorophenoxy)butyrophenone,
γ-(4-phenyl - 1,2,5,6 - tetrahydropyridino) m-trifluoromethyl-p-phenoxybutyrophenone,
γ-(4-phenyl - 1,2,5,6 - tetrahydropyridino) m-fluoro-p-phenoxybutyrophenone and
γ-(4-phenyl - 1,2,5,6 - tetrahydropyridino) m-fluoro-p-(3-trifluoromethylphenoxy)butyrophenone.

An alternate procedure for preparing the compounds of Formula 1, wherein Y is a lower alkylene radical containing at least 2 carbon atoms between Am- and $$-\overset{O}{\underset{\|}{C}}-$$

consists of reacting a diphenylether of Formula 17 with an acid halide of the formula (22)

$$H-\underset{R^7}{\overset{R^6}{\underset{|}{C}}}-\overset{O}{\underset{\|}{C}}-X$$

wherein $R^6$ and $R^7$ each represent hydrogen or lower alkyl and X is as described above, according to the procedure described above, i.e., in the presence of a Lewis acid and an inert solvent, to produce an acyl ketone of the formula (23)

$$H-\underset{R^7}{\overset{R^6}{\underset{|}{C}}}-\overset{O}{\underset{\|}{C}}-\underset{R^1}{\bigcirc}-O-\underset{R^2}{\bigcirc}$$

wherein $R^1$, $R^2$, $R^6$ and $R^7$ are as described above. The acyl ketones of Formula 23 are converted to the amino ketone of Formula 17 by the Mannich reaction (24)

$$AmH + CH_2O + H-\underset{R^7}{\overset{R^6}{\underset{|}{C}}}-\overset{O}{\underset{\|}{C}}-\underset{R^1}{\bigcirc}-O-\underset{R^2}{\bigcirc} \longrightarrow$$

(25)

$$\longrightarrow Am-CH_2-\underset{R^7}{\overset{R^6}{\underset{|}{C}}}-\overset{O}{\underset{\|}{C}}-\underset{R^1}{\bigcirc}-O-\underset{R^2}{\bigcirc}$$

wherein Am, $R^1$, $R^2$, $R^6$ and $R^7$ are as described above.

The compounds of Formula 1 wherein Z is $$-\overset{NOH}{\underset{\|}{C}}-$$

are prepared by reacting an amino ketone of Formula 21, with hydroxylamine hydrochloride in an inert solvent, e.g. ethanol, and preferably at reflux temperature to produce the oxines of the formula (26)

$$Am-Y-\overset{NOH}{\underset{\|}{C}}-\underset{R^1}{\bigcirc}-O-\underset{R^2}{\bigcirc}$$

wherein Am, Y, $R^1$ and $R^2$ are as described above.

The compounds of Formula 1 having the formula (27)

$$Am-Y-\overset{OH}{\underset{|}{CH}}-\underset{R^1}{\bigcirc}-O-\underset{R^2}{\bigcirc}$$

wherein Am, Y, $R^1$ and $R^2$ are as described above, are prepared by catalytic hydrogenation or by chemical reduction with sodium borohydride or lithium aluminum hydride of the amino ketones of Formula 21.

Some of the aminoalcohols which may be formed in this manner are:

β-pyrrolidino-α-(p-phenoxyphenyl)ethanol,
β-piperidino-α-(p-phenoxyphenyl)ethanol,
β-(4-methylpiperazino)-α-(p-phenoxyphenyl)ethanol,
β-(4-phenylpiperazino)α-(p-phenoxyphenyl)ethanol,
β-(4-phenylpiperidino)-α-(p-phenoxyphenyl)ethanol,
β - (4 - phenyl - 1,2,5,6-tetrahydroxypyridino) - α - (p - phenoxyphenyl)ethanol,
β-(4-hydroxypiperidino)-α-(p-phenoxyphenyl)ethanol,
β - (4 - propinyl - 4 - hyroxypiperidino) - α - (p-phenoxyphenyl)ethanol,
β - (4 - cyclopropyl - 4 - hydroxypiperidino) - α - (p - phenoxyphenyl)ethanol,
β - (4 - m - trifluoromethylphenyl - 1,2,5,6 - tetrahydropyridino)-α(p-phenoxypphenyl)ethanol,
β - [4 - (o-methoxyphenyl)piperazino] - α - (p - phenoxyphenyl)ethanol,
β - (4 - phenyl - 4 - carbethoxypiperidino) - α - (p - phenoxyphenyl)ethanol,
γ-pyrrolidino-α-(p-phenoxyphenyl)propanol,
γ-piperidino-α-(p-phenoxyphenyl)propanol,
γ-(4-methylpiperazino)-α-(p-phenoxyphenyl)propanol,
γ-(4-phenylpiperazino)-α-(p-phenoxyphenyl)propanol,
γ-(4-phenylpiperidino)-α-(p-phenoxyphenyl)propanol,
γ - (4 - phenyl - 1,2,5,6 - tetrahydropyridino) - α - (p - phenoxyphenyl)propanol,
γ-(4-hydroxypiperidino)-α-(p-phenoxyphenyl)propanol,
γ - (4 - propinyl - 4 - hydroxypiperidino) - α - (p - phenoxyphenyl)propanol,
γ - (4 - cyclopropyl - 4 - hydroxypiperidino) - α - (p - phenoxyphenyl)propanol,
γ - (4 - m - trifluoromethylphenyl - 1,2,5,6 - tetrahydro - pyridino)-α-(p-phenoxyphenyl)propanol,
γ - [4 - (o - methoxyphenyl)piperazino] - α - (p - phenoxyphenyl)propanol,
γ - (4 - phenyl - 4 - carbethoxypiperidino) - α - (p - phenoxyphenyl)propanol,
γ - (4 - phenyl - 1,2,5,6-tetrahydropyridino) - α - [p - (4 - fluorophenoxy)phenyl]propanol,
γ - (4 - phenyl - 1,2,5,6 - tetrahydropyridino) - α - [p - (3 - trifluoromethylphenoxy)phenyl]propanol,
γ-(4-phenyl-1,2,5,6-tetrahydropyridino)-α-[p-(2-chlorophenoxy)phenyl]propanol
γ-(4-phenyl-1,2,5,6-tetrahydropyridino)-α-(m-trifluoromethyl-p-phenoxyphenyl)propanol,
γ-(4-phenyl-1,2,5,6-tetrahydropyridino)-α-(m-fluoro-p-phenoxyphenyl)propanol,
γ-(4-phenyl-1,2,5,6-tetrahydropyridino)-α-[m-fluoro-p-(3-trifluoromethylphenoxy)phenyl]propanol,
δ-pyrrolidino-α-(p-phenoxyphenyl)butanol,
δ-piperidino-α-(p-phenoxyphenyl)butanol,
δ-(4-methylpiperazino)-α-(p-phenoxyphenyl)butanol,
δ-(4-phenylpiperazino)-α-(p-phenoxyphenyl)butanol,
δ-(4-phenylpiperidino)-α-(p-phenoxyphenyl)butanol,
δ-(4-phenyl-1,2,5,6-tetrahydropyridino)-α-(p-phenoxyphenyl)butanol,
δ-(4-hydroxypiperidino)-α-(p-phenoxyphenyl)butanol,
δ-(4-propinyl-4-hydroxypiperidino)-α-(p-phenoxyphenyl)butanol,
δ-(4-cyclopropyl-4-hydroxypiperidino)-α-(p-phenoxyphenyl)butanol,
δ-(4-m-trifluoromethylphenyl-1,2,5,6-tetrahydropyridino)-α(p-phenoxyphenyl)butanol,
δ-[4-(o-methoxyphenyl)piperazino]-α-(p-phenoxyphenyl)butanol,
δ-(4-phenyl-4-carbethoxypiperidino)-α-(p-phenoxyphenyl)butanol,
δ-(4-phenyl-1,2,5,6-tetrahydropyridino)-α-[p-(4-fluorophenoxy)phenyl]butanol,
δ-(4-phenyl-1,2,5,6-tetrahydropyridino)-α-[p-(3-trifluoromethylphenoxy)phenyl]butanol,
δ-(4-phenyl-1,2,5,6-tetrahydropyridino)-α-[p-(2-chlorophenoxy)phenyl]butanol,
δ-(4-phenyl-1,2,5,6-tetrahydropyridino)-α-(m-trifluoromethyl-p-phenoxyphenyl)butanol,
δ-(4-phenyl-1,2,5,6-tetrahydropyridino)-α-(m-fluoro-p-phenoxyphenyl)butanol, and
δ-(4-phenyl-1,2,5,6-tetrahydropyridino)-α-[m-fluoro-p-(3-tri-fluoromethylphenoxy)phenyl]butanol.

Further reduction produces the unsaturated compounds of the formula (28)

$$Am-Y-\overset{H}{\underset{|}{C}}=\overset{H}{\underset{|}{C}}-\underset{R^1}{\bigcirc}-O-\underset{R^2}{\bigcirc}$$

wherein Am, Y, $R_1$ and $R_2$ are as described above.

To produce the amino alkanes of Formula 1 having the formula

(29) 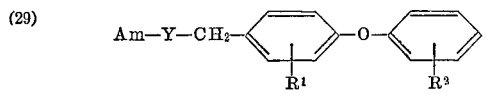

wherein Am, Y, R₁ and R₂ are as described above, the amino ketones of Formula 21 are reduced to the corresponding aminoalkanes via the well known Wolff-Kishner or Clemmensen reduction using hydrazine in ethylene glycol or zinc-amalgan in the hydrochloric acid, respectively.

In this manner, there can be obtained such aminoalkanes as:

γ-(4-phenyl-1,2,5,6-tetrahydropyridino)-α-[p-(4-fluorophenoxy)phenyl]propane,
γ-(4-hydroxypiperidino)-α-[p-(4-fluorophenoxy)phenyl]propane,
γ-(4-propinyl-4-hydroxypiperidino)-α-[p-(4-fluorophenoxy)-phenyl]propane,
γ-(4-cyclopropyl-4-hydroxypiperidino)-α-[p-(4-fluorophenoxy)-phenyl]propane,
δ-(4-hydroxypiperidino)-a-[p-(4-fluorophenoxy)phenyl]butane,
δ-(4-phenyl-1,2,5,6-tetrahydropyridino)-α-[p-(4-fluorophenoxy)phenyl]butane,
δ-(4-propinyl-4-hydroxypiperidino)-a-[p-(4-fluorophenoxy)phenyl]butane and
δ-(4-cyclopropyl-4-hydroxypiperidino)-α-[p-(4-fluorophenoxy)phenyl]butane.

The aminoalcohols of Formula 27 are reacted with an isocyanate of the formula

(30)      O=C=N—R⁸ wherein R⁸ is hydrogen or lower alkyl, to produce the carbamates and substituted carbamates having the formula

(31) 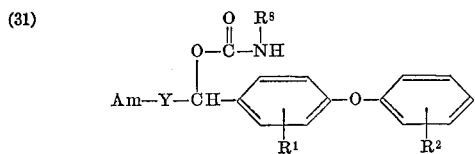

wherein Am, Y, R¹, R² and R⁸ are as described above.

In this manner, there can be obtained such carbamates and substituted carbamates as:

γ-(4-phenyl-1,2,5,6-tetrahydropyridino)-α-(p-phenoxyphenyl)propanol N-butylcarbamate,
γ-(4-carbamyloxypiperidino)-α-[p-(fluorophenoxy)phenyl]propanol carbamate,
δ-(4-carbamyloxypiperidino)-α-[p-(4-fluorophenoxy)phenyl]butanol carbamate,
δ-(4-propinyl-4-carbamyloxypiperidino)-α-[p-(4-fluorophenoxy)phenyl]butanol carbamate,
γ-(4-carbamyloxypiperidino) p-(4-fluorophenoxy)butyrophenone,
γ-(4-N-butylcarbamyloxypiperidino) p-(4-fluorophenoxy)butyrophenone, and
δ-(4-N-butylcarbamyloxypiperidino)-α-[p-(4-fluorophenoxy)phenyl]butanol N-butylcarbamate.

The starting materials used to prepare the compounds of this invention are either known or can be easily prepared in accordance with standard organic procedures described in the literature. For example, the halo alkyl ketones of Formula 29 are prepared by the method described by C. Allen, H. W. Crossman, and A. C. Bell, Can, J. Res. 8, 440 (1933) and the acyl ketones of Formula 23 are prepared by the methods described by A. W. Ingersoll et al., J. Am. Chem. Soc., 58, 1808 (1936); and W. Dilthey et al., J. Prakt. Chem., 117, 337 (1927).

Some of the compounds of the present invention contain one or more asymmetric carbon atoms and thus normally occur as a racemic mixture of the optical isomers. All of the isomers are active and can be separated by conventional methods. The individual isomers and mixtures thereof are included within the scope of the present invention.

The compounds of this invention possess muscle relaxant activity making them useful for muscle relaxation of mammals.

The muscle relaxant activity was determined by pressing the abdomen and flexing the hind limbs of the treated mouse. Limb tone and grip strength were further checked by placing the mice on a vertical pole. A mouse treated with a muscle relaxant drug shows little, if any, resistance to flexing or abdominal tone and is unable to climb the pole or to maintain itself on the pole.

Doses as low as 20 mg./kg. p.o. of the preferred compound of this invention, N-[3-hydroxy-3-(p-phenoxyphenyl)propyl]-4-phenyl-1,2,5,6-tetrahydropyridine, in mice exhibited relaxant activity.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compounds of this invention when administered orally or parenterally in an effective amount are effective in producing muscle relaxation in mammals.

The following examples are intended to illustrate the invention described herein without unduly restricting it.

Example 1.—Preparation of p-phenoxy-γ-chlorobutyrophenone

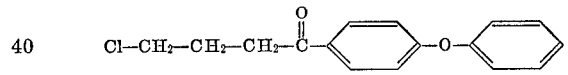

35 gm. of anhydrous AlCl₃ was added cautiously to 200 ml. of diphenyl ether (stir) no heat was evolved. γ-Chlorobutyryl chloride (35 gm.) was then added slowly. The solution became darker and after ½ hour was blood red. Hydrochloride gas was evolved but little heat was generated. The solution was stirred for about 1 more hour. The dark red solution was then poured onto ice and stirred (blue then white color) after stir for 15 minutes, 220 ml. of concentrated hydrochloric acid was added. The solution became clear and 2 layers formed. This solution was stirred for 1 hour then extracted with ether. The ether solution was then washed with NaHCO₃ solution, then water, dried, and stripped to give a 200 ml. of an oil. After allowing this to stand for several days in a shallow dish and then pumping under high vacuum to remove diphenyl ether, the p-phenoxy-γ-chlorobutyrophenone crystallized.

Example 2.—Preparation of N-[β-(p-phenoxybenzoyl)-ethyl] - 4 - phenyl - 1,2,5,6 - tetrahydropyridine - 2-naphthalene sulfonate

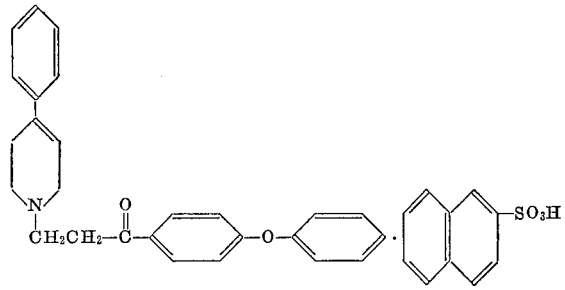

A mixture of p-phenoxy-β-chloropropiophenone (13 g., 0.05 mole), 4-phenyl-1,2,5,6-tetrahydropyridine (8 g., 0.05 mole), triethylamine (7 ml., 0.05 mole), and 25 ml. of dimethylformamide was heated on a water bath at 70° C. for 4 hours, and then poured into 200 ml. of water. After 24 hours, the oil that was formed was triturated with water, then taken up in methylene chloride and dried over potassium carbonate. The solvent was evaporated to give 19 g. (98%) of a brown oil. This product was taken up in 200 ml. of boiling isopropanol and a hot solution of 2-naphthalene sulfonic acid in 200 ml. of isopropanol was added rapidly. After 0.75 hour, the salt was filtered, washed with isopropanol, acetone, and ether to give 16 g. (53%) of the product; M.P. 190.5–191° C.

*Analysis.*—Calc'd for $C_{36}H_{33}NO_5S$: C, 73.08; H, 5.62; N, 2.37. Found: C, 72.10; H, 5.76; N, 2.44.

Example 3.—Preparation of 1-[β-(p-phenoxybenzoyl)-ethyl]-4-phenyl-1,2,5,6-tetrahydropyridine oxime

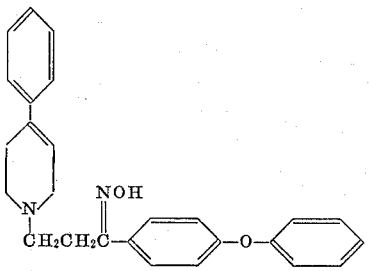

A mixture of 1-[β-(p-phenoxybenzoyl)-ethyl]-4-phenyl-1,2,5,6-tetrahydropyridine (1.9 g., 0.005 mole), hydroxylamine hydrochloride (0.35 g., 0.005 mole), and ethanol (20 ml.) was heated in a warm water bath for 2 hours. Evaporation of the ethanol gave an oily substance from which the oxime was obtained by treatment with aqueous sodium hydroxide. The crude base, after recrystallization from methanol, weighed 0.6 g. (33% yield) M.P. 182–184° C. A second preparation gave the crude oxime, M.P. 180–182° C.

*Analysis.*—Calc'd for $C_{26}H_{26}N_2O_2$: C, 78.36; H, 6.58; N, 7.03. Found: C, 76.84; H, 6.44; N, 7.66.

Example 4.—Preparation of N-[3-hydroxy-3-(p-phenoxyphenyl)-propyl]-4-phenyl - 1,2,5,6 - tetrahydropyridine hydrochloride

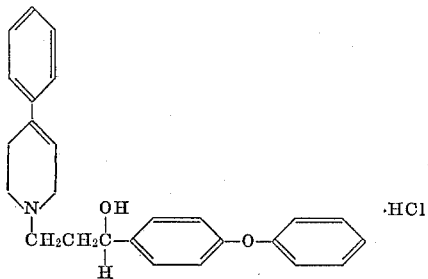

A mixture of N-[2-(p-phenoxybenzoyl)-ethyl]-4-phenyl-1,2,5,6-tetrahydropyridine (4 g., 0.01 mole), sodium borohydride (2 g., 0.05 mole), and 150 ml. of dry ethanol was refluxed for 6 hours. The solvent was removed and the residue shaken with water and methylene chloride. After drying and evaporating the organic layer, the hydrochloride of the product was made in ethanol. Recrystallization from ethanol gave 2.8 g. (65%) of the product, M.P. 203–203.5° C.

*Analysis.*—Calc'd for $C_{26}H_{28}ClNO_2$: C, 74.01; H, 6.69; N, 3.32; Cl, 8.90. Found: C, 73.69; H, 6.77; N, 3.27; Cl, 8.94.

Example 5.—Preparation of 2 - [4 - (p - nitrophenoxy)- benzoyl]-ethyl - 4 - phenyl - 1,2,5,6-tetrahydropyridine hydrochloride

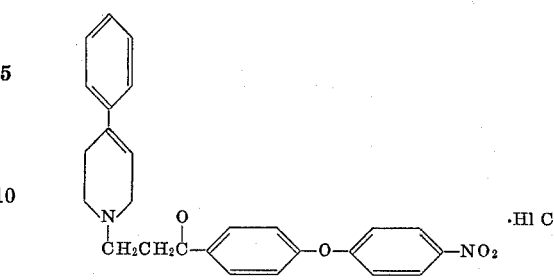

A mixture of 4-(p-nitrophenoxy)-acetophenone (12.8 g., 0.05 mole), paraformaldehyde (1.5 g., 0.05 mole), 4-phenyl-1,2,5,6-tetrahydropyridine hydrochloride (9.8 g., 0.05 mole) and acetic acid (25 ml.) was stirred at 95° C. for 2 hours. The acetic acid was evaporated and the residue diluted with acetone. The solid which separated weighed 11.68 g., M.P. 197–198° C. A portion was recrystallized from ethanol melted at 198–199° C.

*Analysis.*—Calc'd for $C_{26}H_{25}N_2O_4Cl$: C, 67.17; H, 5.42; N, 6.02; Cl, 7.63. Found: C, 67.6; H, 5.55; N, 5.85; Cl, 7.6.

Example 6.—Preparation of 3 - [N - (4 - phenyl-1,2,5,6-tetrahydropyridino)]-1-[4-(p-nitrophenoxy) - phenyl]-1-propanol hydrochloride

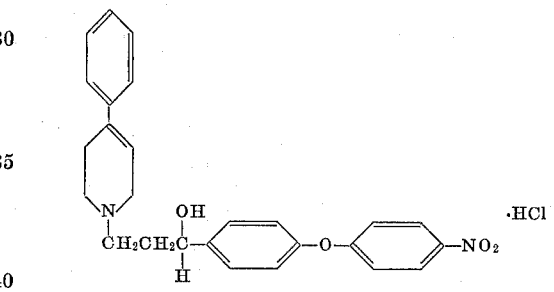

A mixture of 2-[4-(p-nitrophenoxy)-benzoyl]-ethyl-4-phenyl-1,2,5,6-tetrahydropyridine (3.6 g., 0.0086 mole) and methanol (60 ml.) was treated with sodium borohydride (1.5 g., 0.04 mole) and the mixture stirred for 2 hours, then filtered to give 2.55 g. solid (69% yield). The solid was placed in hot ethanolic hydrogen chloride and after cooling, the hydrochloride salt was collected. The salt weighed 2.2 g., M.P. 213–214° C. Two recrystallizations from ethanol gave product, M.P. 214–215° C.

*Analysis.*—Calc'd for $C_{26}H_{27}N_2O_4Cl$: C, 66.88; H, 5.83; N, 6.00; Cl, 7.59. Found: C, 66.81; H, 6.06; N, 5.44; Cl, 7.66.

Example 7.—Preparation of 3-(4-phenyl-1,2,5,6-tetrahydropyridino) - 1 - (phenoxyphenyl-1-propanol N-butylcarbamate fumarate

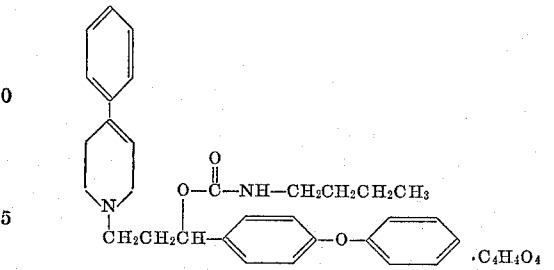

A mixture of 3-(4-phenyl-1,2,5,6-tetrhaydropyridino)-1-(p-phenoxyphenyl) - 1 - propanol (2- g., 0.005 mole), butyl isocyanate (0.6 g., 0.005 mole) and toluene (30 ml.) was heated at reflux with stirring for 2 hours. The toluene was evaporated and the residue treated with fumaric acid (0.6 g.) dissolved in hot isopropanol. The salt was obtained after addition of petroleum ether and methylene chloride, M.P. 122–130° C. It was recrystallized from heptane-n-butanol to give 1.5 g. of solid, M.P. 128–130° C.

*Analysis.*—Calc'd for $C_{35}H_{38}N_2O_7$: C, 70.21; H, 6.40; N, 4.68. Found: C, 68.95; H, 6.57; N, 4.82.

Example 8.—Preparation of 1 - [γ - (p-phenoxybenzoyl) propyl]-4-phenyl-1,2,5,6-tetrahydropyridine 2-naphthalene sulfonate

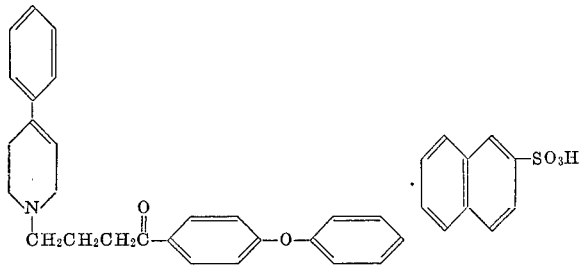

A mixture of 4-phenyl-1,2,5,6-tetrahydropyridine (8 g., 0.05 mole), p-phenoxy-γ-chlorobutyrophenone (14 g., 0.05 mole), anhydrous potassium carbonate (14 g., 0.1 mole), potassium iodide (1 g.) and dimethylformamide (30 ml.) was heated at reflux for 7 hours with stirring. The mixture was poured into water. The free base in isopropanol was treated with β-naphthalene sulfonic acid (8 g., 0.04 mole). The salt which precipitated was recrystallized from isopropanol, M.P. 202–203.5° C.

*Analysis.*—Calc'd for $C_{37}H_{35}NO_2S$: C, 73.35; H, 5.77; N, 2.31. Found: C, 73.61; H, 5.89; N, 2.27.

Example 9.—Preparation of N-[4-hydroxy-4-(p-phenoxyphenyl)butyl] - 4 - phenyl - 1,2,5,6-tetrahydropyridine hydrochloride

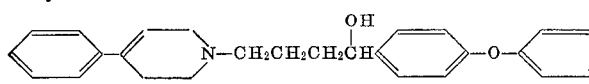

A mixture of N-[3-(p-phenoxybenzoyl)-propyl]-4-phenyl-1,2,5,6-tetrahydropyridine (4 g. 0.01 mole), sodium borohydride (2 g., 0.05 mole) and 200 ml. of dry ethanol was refluxed for 6 hours. The solvent was then evaporated and the residue shaken with water and methylene chloride. The organic layer was taken dried and evaporated to yield 4 g. of a yellow oil, which was treated with excess alcoholic hydrochloric acid. After cooling, 3.2 g. (74%) of the product crystallized; M.P. 160–161° C.

*Analysis.*—Calc'd for $C_{27}H_{30}ClNO_2$: C, 74.39; H, 6.94; N, 3.21; Cl, 8.13. Found: C, 74.46; H, 6.90; N, 3.30; Cl, 8.02.

Example 10.—Preparation of β-(N-piperidino)-p-phenoxypropiophenone hydrochloride

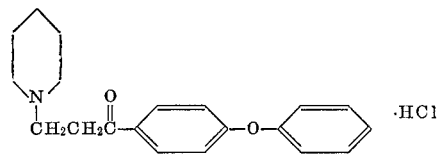

A solution of piperidine (12.75 g., 0.15 mole), p-phenoxy-3-chloropropiophenone (19.6 g., 0.075 mole) and dimethylformamide (30 ml.) was heated at 70° C. for 4 hours. The reaction mixture was diluted with water and the aqueous layer decanted. The remaining oil was dissolved in methylene chloride and the resulting solution dried over anhydrous potassium carbonate. Evaporation of the solvent gave 19.4 g. of oil which when treated with a solution of 2-naphthalene sulfonic acid (13 g.) in isopropanol gave a solid salt weighing 11.5 g., M.P. 140–143° C. The base was liberated from the salt and 1.9 g. was converted into the hydrochloride, M.P. 168.5–171° C. The melting point after recrystallization was 162–163° C.

*Analysis.*—Calc'd for $C_{20}H_{24}NO_2Cl$: C, 69.45; H, 6.99; N, 4.05; Cl, 10.26. Found: C, 69.36; H, 6.83; N, 4.11; Cl, 10.18.

Example 11.—Preparation of 3-(N-piperidino)-1-(p-phenoxyphenyl)-1-propanol

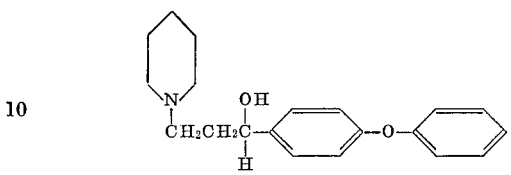

A mixture of 3-(N-piperidino)-p-phenoxypropiophenone (3.7 g., 0.012 mole), sodium borohydride (2 g., 0.05 mole) and ethanol (50 ml.) was heated at reflux for 1.5 hours then cooled. The mixture was filtered and the filtrate treated with ethanolic hydrogen chloride. Evaporation of the solvents gave an oil which crystallized. The base was liberated and weighed 2.4 g. It was recrystallized from heptane, M.P. 79–81° C.

*Analysis.*—Calc'd for $C_{20}H_{25}NO_2$: C, 77.13; H, 8.09; N, 4.50. Found: C, 77.23; H, 7.97; N, 4.55.

Example 12.—Preparation of γ-(N-piperidino)-p-phenoxybutyrophenone 2-naphthalene sulfonate

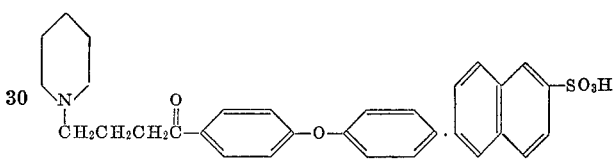

A mixture of piperidine (6.4 g., 0.075 mole), γ-chloro-p-phenoxybutyrophenone (20.6 g., 0.075 mole), anhydrous potassium carbonate (11 g., 0.075 mole), sodium iodide (11 g., 0.075 mole) and dimethylformamide (30 ml.) was heated at reflux with stirring. In order to insure a sufficient quantity of amine, a further quantity of piperidine roughly equal to the above 6.4 g. was added. The mixture was heated at reflux for 24 hours. After cooling, the solution was poured into water. The brown oil which settled out was isolated by decanting the bulk of the water and then dissolved in ether. Evaporation of the ether gave 20 g. of brown oil. Treatment of the oil with β-naphthalene sulfonic acid 15 g. dissolved in hot isopropanol gave when cool a solid salt which weighed 10 g. when collected. The salt, M.P. 132–133° C., was recrystallized twice from isopropanol to give 8.4 g. of solid, M.P. 132.5–133° C.

*Analysis.*—Calc'd for $C_{31}H_{33}NO_5S$: C, 70.04; H, 6.26; N, 2.64; S, 6.02. Found: C, 63.59; H, 6.07; N, 2.97; S, 6.69.

Example 13.—Preparation of 4-(N-piperidino)-1-(p-phenoxyphenyl)-1-butanol hydrochloride

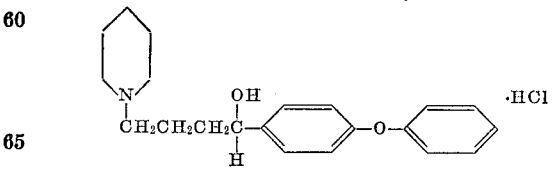

A mixture of γ-(N-piperidino)-p-phenoxybutyrophenone (3.6 g., 0.011 mole), sodium borohydride (0.4 g., 0.011 mole), and methanol (50 ml.) was stirred until all the heat of the reduction was gone and then concentrated. The residue crystallized upon the addition of water and ether. The ether was evaporated and the base collected; weight 3.1 g. (86% yield). The base was converted into the hydrochloride salt which melted at 153–153.5° C. (isopropanol-heptane).

*Analysis.*—Calc'd for C₂₁H₂₆NO₂Cl: C, 70.09; H, 7.28; N, 3.89; Cl, 9.85. Found: C, 69.43; H, 7.89; N, 3.99; Cl, 9.86.

Example 14.—Preparation of 1-[γ-(p-phenoxybenzoyl)-propyl]-4-hydroxypiperidine

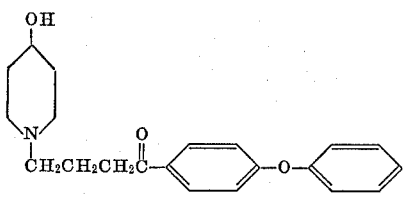

A mixture of 4-hydroxypiperidine (5 g., 0.05 mole), p-phenoxy-4-chlorobutyrophenone (16.5 g., 0.06 mole), anhydrous potassium carbonate (20 g., 0.142 mole) sodium iodide (0.3 g.) and methyl isobutyl ketone (250 ml.) was stirred and heated at reflux for 60 hours. The mixture was filtered and then concentrated to give an oil. The oil was dissolved in ether and treated with ethereal hydrogen chloride. A solid separated. By adding benzene and permitting the almost homogeneous mixture to stand, a solid was obtained. The solid was collected as two crops whose combined weight was 7.2 g., M.P. 107–117° C. A 1-gram sample was recrystallized twice from acetophenone to give a solid, M.P. 104–106° C.

The hydrochloride salt, M.P. 104–106° C., did not give a satisfactory elemental analysis. The salt was converted into the free base, M.P. 92–95° C. The base was recrystallized n-heptane isopropanol to give 2.15 g. solid, M.P. 97.5–98.5° C.

*Analysis.*—Calc'd for C₂₁H₂₅NO₃: 74.31; H, 7.42; N, 4.13; O, 14.14. Found: C, 74.57; H, 7.50; N, 3.66.

Example 15.—Preparation of 1-[γ(p-phenoxy)-benzoyl-propyl] - 4 - (m - trifluoromethylphenyl) - 4 - hydroxypiperidine 2-naphthalene sulfonate

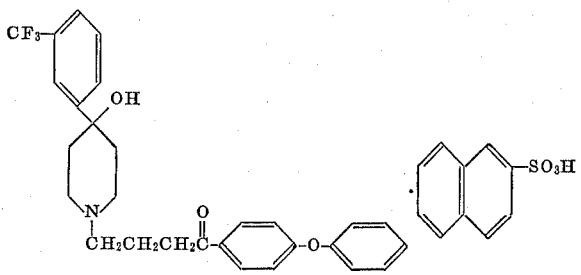

A mixture of 4-m-trifluoromethylphenyl-4-hydroxypiperidine (5 g., 0.018 mole), p-phenoxy-ω-chlorobutyrophenone (5 g., 0.018 mole), potassium iodide (3 g., 0.018 mole) and dimethylformamide (25 ml.) was heated at reflux for 20 hours then added to water (250 ml.). The oil which separated was extracted with methylene chloride and the extract dried and concentrated to 8.56 g. of oil (83% yield). The 2-naphthalene sulfate salt was prepared and recrystallized from isopropanol, M.P. 161–163° C., yield 3 g.

*Analysis.*—Calc'd for C₃₈H₃₆F₃NO₆S: C, 65.95; H, 5.24; N, 2.02. Found: C, 65.76; H, 5.33; N, 1.96.

Example 16.—Preparation of 1-[γ-(p-phenoxybenzoyl)]-4 - phenyl - 4 - hydroxymethylpiperidine 2 - naphthalene sulfonate

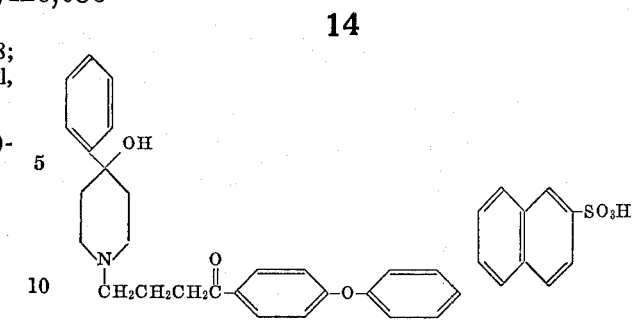

A mixture of 4-hydroxymethyl-4-phenylpiperidine (5 g., 0.026 mole), 4-chloro-p-phenoxybutyrophenone (7.2 g., 0.026 mole), anhydrous potassium carbonate (4.0 g., 0.3 mole), potassium iodide (4 g., 0.026 mole) and dimethylformamide (50 ml.) was stirred at 150° C. for 22 hours. The reaction mixture was added to water and permitted to stand for 2 hours. The solid was collected, weight 10.5 g. The base was converted into the 2-naphthalene sulfonate salt, M.P. 124–131° C. The salt was recrystallized from isopropanol after which it melted at 129.5–132° C.

*Analysis.*—Calc'd for C₃₈H₃₉NO₆S; C, 71.57; H, 6.16: N, 2.20; S, 5.03. Found: C, 70.95; H, 6.24; N, 2.27; S, 4.43.

Example 17.—Preparation of γ-(N-4-carbethoxy-4-phenylpiperidino) - p - phenoxybutyrophenone 2 - naphthalene sulfonate

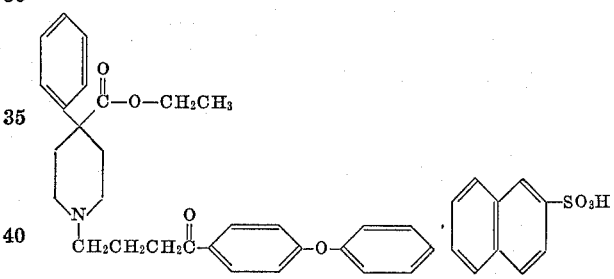

A mixture of 4-carbethoxy-4-phenylpiperidine (11.7 g., 0.5 mole) crude p-phenoxy-γ-chlorobutyrophenone (15 g., 0.05 mole), potassium carbonate (13.8 g.) and dimethylformamide (40 ml.) was stirred at reflux. After a 4-hour period, the hot mixture was poured into about 200 ml. of water. A brown oil separated and was freed from its salt by stirring in a mixture of methylene chloride and sodium carbonate solution. The base was converted into the naphthalene-2-sulfonate salt as above.

*Analysis.*—Calc'd for C₄₀H₄₁NO₇S: C, 70.67; H, 6.08; N, 2.06; S, 4.72. Found: C, 69.41; H, 5.88; N, 2.15; S, 5.21.

Example 18.—Preparation of 1 - (o - methoxyphenyl)-4 - [β - (p - phenoxybenzoyl) - ethyl] - piperazine hydrochloride

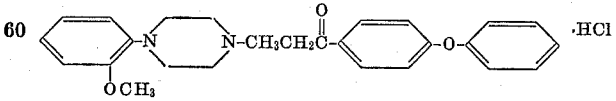

A mixture of N-(o-methoxyphenyl)-piperazine dihydrochloride (13.7 g., 0.05 mole), p-phenoxyacetophenone (10 g., 0.048 mole), paraformaldehyde (1.5 g., 0.05 mole) in a mixture of ethanol (45 ml.), dioxane (45 ml.) and dimethylformamide (15 ml.) was heated at a gentle reflux overnight. After cooling, the mixture was treated with ether and placed in the refrigerator. The first crop of crystals weighed 8.7 g., M.P. 147–178° C. The salt was recrystallized from n-butanol, M.P. 173–175° C.

*Analysis.*—Calc'd for C₂₆H₃₀N₂O₃Cl: C, 68.93; H, 6.45; N, 6.18; Cl, 7.83. Found: C, 68.27; H, 6.71; N, 6.33; Cl, 7.97.

Example 19.—Preparation of 1-[γ-(p-phenoxybenzoyl)-propyl] - 4 - (o - methoxyphenyl) - piperazine - 2-naphthalene sulfonate

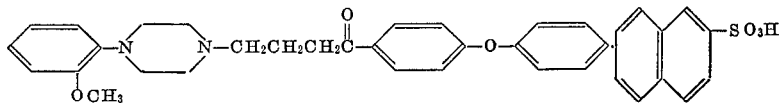 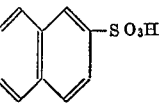

A mixture of o-methoxyphenylpiperazine (7 g., 0.036 mole), 3-(p-phenoxybenzoyl)-1-chloropropane (10 g., 0.036 mole), potassium iodide (6 g., 0.036 mole), potassium carbonate (4.6 g., 0.036 mole), and 50 ml. of dimethylformamide was stirred and refluxed for 24 hours, then poured into 400 ml. of water. The solution was decanted and the oil washed with water, then taken up in methylene chloride. This solution was dried over potassium carbonate, and the solvent removed to yield 15 g. of crude oil. The salt was made in hot isopropanol by adding a solution of one equivalent of 2-naphthalene sulfonic acid to the hot solution of the free base. Upon cooling, the product crystallized, was washed with isopropanol, acetone, then ether, and dried to give 8 g. (52%) of the crude salt, M.P. 208–209° C. This was recrystallized from propylene glycol, M.P. 215–217° C.

Example 20.—Preparation of 4-(o-methoxyphenylpiperazino)-1-(p-phenoxyphenyl)-1-butanol hydrochloride

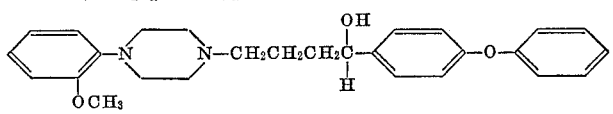

A mixture of 1 - [γ - (p-phenoxybenzoyl)-propyl]-4-(o-methoxyphenyl)-piperazine (7.6 g., 0.018 mole), sodium borohydride (2 g., 0.042 mole), and methanol (50 ml.) was stirred and heated overnight. The methanol was evaporated and the residue extracted with methylene chloride. The methylene chloride solution when concentrated gave 7.95 g. of a residue. A portion (2.5 g.) of the residue was converted to its hydrochloride, M.P. 200–205° C. The salt after recrystallization from ethanol weighed 2.75 g., M.P. 199–201° C.

*Analysis.*—Calc'd for $C_{27}H_{33}N_2O_3Cl$: C, 69.15; H, 7.09; N, 5.97; Cl, 7.56. Found: C, 68.41; H, 6.98; N, 6.01; Cl, 9.81.

Example 21.—Preparation of 1-(o-methoxyphenyl)-4-(p-phenoxycinnamyl)piperazine hydrochloride

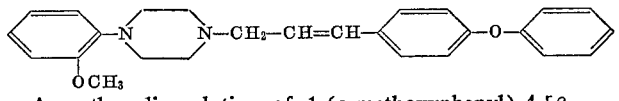

A methanolic solution of 1-(o-methoxyphenyl)-4-[β-(p-phenoxybenzoyl) - ethyl] - piperazine (1.8 g., 0.004 mole) was treated with sodium borohydride (15 g., 0.004 mole) in three portions over 1.5 hours. The methanol was evaporated and the residue treated with dilute sodium carbonate solution. The solution was extracted with ether and the extract dried over sodium carbonate and concentrated to give 1.58 g. of colorless oil. The oil was treated with ethanolic hydrochloric acid to give a salt 1.35 g., M.P. 164–166° C. The pure salt melted at 164.5–165.5° C.

*Analysis.*—Calc'd for $C_{25}H_{29}ClN_2O_2$: C, 65.96; H, 6.39; N, 5.92; Cx, 14.98. Found: C, 65.86; H, 6.75; N, 5.76; Cl, 14.97.

Example 22.—Preparation of 2-[4-(p-fluorophenoxy)-benzoyl]-ethyl-4-phenyl-1,2,5,6-tetrahydropyridine hydrochloride

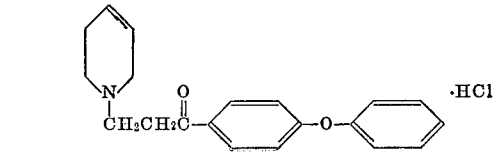

8.36.

A mixture of 4-(p-fluorophenoxy)-acetophenone (3.6 g., 0.016 mole), 4-phenyl-1,2,5,6-tetrahydropyridine hydrochloride (3.05 g., 0.016 mole), paraformaldehyde (0.47 g., 0.016 mole) and acetic acid (7 ml.) was stirred for 2 hours at 90° C. and 1 hour at 60° C., then concentrated at reduced pressure. The residue was diluted with acetone and petroleum ether. A first crop of crystals was collected weighing 1.5 g., M.P. 175–187° C. A second crop was obtained which melted at 143–163° C., and appeared to contain only a small amount of the first crop material judging from their infrared spectra. The first crop material was recrystallized from n-butanol to give 0.6 g. of product, M.P. 192–193° C.

*Analysis.*—Calc'd for $C_{26}H_{25}NO_2ClF$: C, 71.30; H, 5.75; N, 3.20; Cl, 8.50. Found: C, 71.85; H, 5.85; N, 3.51; Cl, 8.50.

Example 23.—Preparation of N-[β-(p-phenoxybenzoyl)-ethyl]-4-phenyl-1,2,5,6-tetrahydropyridine hydrochloride Two grams of the product of Example 2 was converted to the free base and then to the hydrochloride by adding excess alcoholic hydrochloric acid. The salt crystallized from ethanol, M.P. 190–191° C.

*Analysis.*—Calc'd for $C_{26}H_{26}NO_2Cl$: C, 74.36; H, 6.24; N, 3.34; Cl, 8.44. Found: C, 74.30; H, 6.26; N, 3.43; Cl, 7.52.

Example 24.—Preparation of N-[γ-(p-phenoxybenzoyl)-propyl] - 4 - phenyl-1,2,5,6-tetarahydropyridine hydrochloride The product of Example 8 was converted to the free base and then to the hydrochloride salt by the method of Example 23, M.P. 163.5–165° C.

*Analysis.*—Calc'd for $C_{27}H_{28}ClNO_2$: C, 74.72; H, 6.52; N, 3.23; Cl, 8.17. Found: C, 74.15; H, 6.41; N, 3.40; Cl, Example 25.—Preparation of 1-[γ-(p-phenoxybenzoyl)-propyl] - 4-(o-methoxyphenyl)-piperazine dihydrochloride

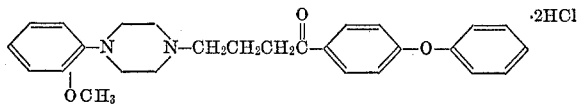

The product of Example 19 was converted to the free base and then the hydrochloride salt was made in methylene chloride. After recrystallization from ethanol, the melting point was 202–204° C.

*Analysis.*—Calc'd for $C_{27}H_{32}Cl_2N_2O_3$: C, 64.41; H, 6.41; N, 5.57; Cl, 14.09. Found: C, 64.32; H, 6.36; N, 5.16; Cl, 12.95.

Example 26.—Preparation of 3-[N-(4-phenyl-1,2,5,6, tetrahydropyridino)] - 1-[4-(p-fluorophenoxy)-phenyl]-1-propanol

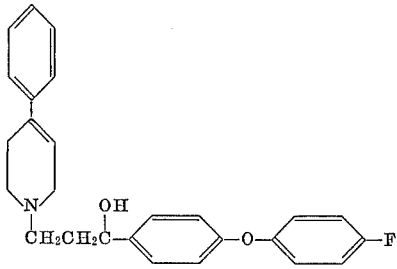

A solution of 2-[4-(p-fluorophenoxy)-benzoyl]-ethyl-4-phenyl-1,2,5,6-tetrahydropyridine (4 g., 0.01 mole) and methanol (50 ml.) was treated with sodium borohydride (1 g., 0.026 mole) and the resulting mixture stirred overnight. A solid separated which weighed 3.3 g. (80% yield), M.P. 112.5–114° C. The base was recrystallized from ethanol, M.P. 112–113° C.

*Aanalysis.*—Calc'd for $C_{26}H_{26}FNO_2$: C, 76.38; H, 6.50; N, 3.48. Found: C, 76.50; H, 6.70; N, 3.69.

Example 27

When, in the procedure of Example 2, 4-phenyl-1,2,5,6-tetrahydropyridine is replaced by an equal molar amount of 1,2,5,6-tetrahydropyridine,
4-(p-chlorophenyl)-1,2,5,6-tetrahydropyridine,
4-(p-trifluoromethylphenyl)-1,2,5,6-tetrahydropyridine,
4-(o-bromophenyl) 1,2,5,6-tetrahydropyridine,
4-(m-iodophenyl)-1,2,5,6-tetrahydropyridine,
4-(p-fluorophenyl)-1,2,5,6-tetrahydropyridine,
4-(p-methylphenyl)-1,2,5,6-tetrahydropyridine,
4-(p-methoxyphenyl)-1,2,5,6-tetrahydropyridine,
2-methyl-1,2,5,6-tetrahydropyridine,
3-ethinyl-1,2,5,6-tetrahydropyridine,
4-cyclopropyl-1,2,5,6-tetrahydropyridine,
4-hydroxy-1,2,5,6-tetrahydropyridine,
4-carbethoxy-1,2,5,6-tetrahydropyridine,
5-ethyl-1,2,5,6-tetrahydropyridine,
6-cyclohexyl-1,2,5,6-tetrahydropyridine,
4-cyclopentyl-1,2,5,6-tetrahydropyridine,
2,4-dimethyl-1,2,5,6-tetrahydropyridine,
3-methyl-5-cyclopropyl-1,2,5,6-tetrahydropyridine,
pyrrolidine,
3-methylpyrrolidine,
2,4-dimethylpyrrolidine,
3-phenylpyrrolidine,
3-(4-trifluoromethylphenyl)pyrrolidine and
2-(4-chlorophenyl)pyrrolidine, there are obtained, N-[β-(p-phenoxybenzoyl)-ethyl]-1,2,5,6-tetrahydropyridine,
N-[β-(p-phenoxybenzoyl)-ethyl]-4-(p-chlorophenyl)-1,2,5,6-tetrahydropyridine,
N-[β-(p-phenoxybenzoyl)-ethyl]-4-(p-trifluoromethylphenyl)-1,2,5,6-tetrahydropyridine,
N-[β-(p-phenoxybenzoyl)-ethyl]-4-(o-bromophenyl)-1,2,5,6-tetrahydropyridine,
N-[β-(p-phenoxybenzoyl)-ethyl]-4-(m-iodophenyl)-1,2,5,6-tetrahydropyridine,
N-[β-(p-phenoxybenzoyl)-ethyl]-4-(p-fluorophenyl)-1,2,5,6-tetrahydropyridine,
N-[β-(p-phenoxybenzoyl)-ethyl]-4-(p-methylphenyl)-1,2,5,6-tetrahydropyridine,
N-[β-(p-phenoxybenzoyl)-ethyl]-4-(p-methoxyphenyl)-1,2,5,6-tetrahydropyridine,
N-[β-(p-phenoxybenzoyl)-ethyl]-2-methyl-1,2,5,6-tetrahydropyridine,
N-[β-(p-phenoxybenzoyl)-ethyl]-3-ethinyl-1,2,5,6-tetrahydropyridine,
N-[β-(p-phenoxybenzoyl)-ethyl]-4-cyclopropyl-1,2,5,6-tetrahydropyridine,
N-[β-(p-phenoxybenzoyl)-ethyl]-4-hydroxy-1,2,5,6-tetrahydropyridine,
N-[β-(p-phenoxybenzoyl)-ethyl]-4-carbethoxy-1,2,5,6-tetrahydropyridine,
N-[β-(p-phenoxybenzoyl)-ethyl]-5-ethyl-1,2,5,6-tetrahydropyridine,
N-[β-(p-phenoxybenzoyl)-ethyl]-6-cyclohexyl-1,2,5,6-tetrahydropyridine,
N-[β-(p-phenoxybenzoyl)-ethyl]-4-cyclopentyl-1,2,5,6-tetrahydropyridine,
N-[β-(p-phenoxybenzoyl)-ethyl]-2,4-dimethyl-1,2,5,6-tetrahydropyridine,
N-[β-(p-phenoxybenzoyl)-ethyl]-3-methyl-5-cyclopropyl-1,2,5,6-tetrahydropyridine,
N-[β-(p-phenoxybenzoyl)-ethyl]pyrrolidine,
N-[β-(p-phenoxybenzoyl)-ethyl]-3-methylpyrrolidine,
N-[β-(p-phenoxybenzoyl)-ethyl]-2,4-dimethylpyrrolidine,
N-[β-(p-phenoxybenzoyl)-ethyl]-3-phenylpyrrolidine,
N-[β-(p-phenoxybenzoyl)-ethyl]-3-(4-trifluoromethylphenyl)-pyrrolidine and
N-[β-(p-phenoxybenzoyl)-ethyl]-3-(4-chlorophenyl) pyrrolidine, respectively.

Example 28

When, in the procedure of Example 4, N-[2-(p-phenoxybenzoyl)-ethyl]-4-phenyl-1,2,5,6-tetrahydropyridine is replaced by an equal molar amount of each of the products of Example 27, there are obtained.

N-[3-hydroxy-3-(p-phenoxyphenyl)-propyl]-1,2,5,6-tetrahydropyridine,
N-[3-hydroxy-3-(p-phenoxyphenyl)-propyl]-4-(p-chlorophenyl)-1,2,5,6-tetrahydropyridine,
N-[3-hydroxy-3-(p-phenoxyphenyl)-propyl]-4-(p-trifluoromethylphenyl)-1,2,5,6-tetrahydropyridine,
N-[3-hydroxy-3-(p-phenoxyphenyl)propyl]-4-(o-bromophenyl)-1,2,5,6-tetrahydropyridine,
N-[3-hydroxy-3-(p-phenoxyphenyl)-propyl]-4-(m-iodophenyl)-1,2,5,6-tetrahydropyridine,
N-[3-hydroxy-3-(p-phenoxyphenyl)-propyl]-4-(p-fluorophenyl)-1,2,5,6-tetrahydropyridine,
N-[3-hydroxy-3-(p-phenoxyphenyl)-propyl]-4-(p-methylphenyl)-1,2,5,6-tetrahydropyridine,
N-[3-hydroxy-3-(p-phenoxyphenyl)-propyl]-4-(p-methoxyphenyl)-1,2,5,6-tetrahydropyridine,
N-[3-hydroxy-3-(p-phenoxyphenyl)-propyl]-2-methyl-1,2,5,6-tetrahydropyridine,
N-[3-hydroxy-3-(p-phenoxyphenyl)-propyl]-3-ethinyl-1,2,5,6-tetrahydropyridine,
N-[3-hydroxy-3-(p-phenoxyphenyl)-propyl]-4-cyclopropyl-1,2,5,6-tetrahydropyridine,
N-[3-hydroxy-3-(p-phenoxyphenyl)-propyl]-4-hydroxy-1,2,5,6-tetrahydropyridine,
N-[3-hydroxy-3-(p-phenoxyphenyl)-propyl]-4-carbethoxy-1,2,5,6-tetrahydropyridine,
N-[3-hydroxy-3-(p-phenoxyphenyl)-propyl]-5-ethyl-1,2,5,6-tetrahydropyridine, N-[3-hydroxy-3-(p-phenoxyphenyl)-propyl]-6-cyclohexyl-1,2,5,6-tetrahydropyridine,
N-[3-hydroxy-3-(p-phenoxyphenyl)-propyl]-4-cyclopentyl-1,2,5,6-tetrahydropyridine,
N-[3-hydroxy-3-(p-phenoxyphenyl)-propyl]-2,4-dimethyl-1,2,5,6-tetrahydropyridine,
N-[3-hydroxy-3-(p-phenoxyphenyl)-propyl]-3-methyl-5-cyclopropyl-1,2,5,6-tetrahydropyridine,
N-[3-hydroxy-3-(p-phenoxyphenyl)-propyl]-pyrrolidine,
N-[3-hydroxy-3-(p-phenoxyphenyl)-propyl]-3-methylpyrrolidine,
N-[3-hydroxy-3-(p-phenoxyphenyl)-propyl]-2,4-dimethylpyrrolidine,
N-[3-hydroxy-3-(p-phenoxyphenyl)-propyl]-3-phenylpyrrolidine,
N-[3-hydroxy-3-(p-phenoxyphenyl)-propyl]-3-(4-trifluoromethylphenyl)pyrrolidine and
N-[3-hydroxy-3-(p-phenoxyphenyl)-propyl]-2-(4-chlorophenyl)pyrrolidine, respectively.

Example 29

When, in the procedure of Example 2, p-phenoxy-$\beta$-chloropropiophenone is replaced by an equal molar amount of p-phenoxy-$\alpha$-chloroactophenone,
p-phenoxy-$\delta$-chlorovalerophenone,
p-phenoxy-$\epsilon$-chlorohexanophenone,
p-phenoxy-$\alpha$-chloropropiophenone,
p-phenoxy-$\beta$-chlorobutyrophenone,
o-chloro-p-phenoxy-$\beta$-chloropropiophenone,
m-bromo-p-phenoxy-$\beta$-chloropropiophenone,
o,m-methylenedioxy-p-phenoxy-$\beta$-chloropropiophenone,
m-nitro-p-phenoxy-$\beta$-chloropropiophenone,
m-trifluoromethyl-p-phenoxy-$\beta$-chloropropiophenone,
o-amino-p-phenoxy-$\beta$-chloropropiophenone,
p-(4-chlorophenoxy)-$\beta$-chloropropiophenone,
p-(3-iodophenoxy)-$\beta$-chloropropiophenone,
p-(4-trifluoromethylphenoxy)-$\beta$-chloropropiophenone,
p-(2-bromophenoxy)-$\beta$-chloropropiophenone,
p-(4-methoxyphenoxy)-$\beta$-chloropropiophenone,
p-(4-methylphenoxy)-$\beta$-chloropropiophenone,
o-chloro-p-(4-chlorophenoxy-$\beta$-chloropropiophenone and
o-trifluoromethyl-p-(3-fluorophenoxy)-$\beta$-chloropropiophenone, there are obtained, N-(p-phenoxybenzoylmethyl)-4-phenyl-1,2,5,6-tetrahydropyridine,
N-[$\delta$-(p-phenoxybenzoyl)-butyl]-4-phenyl-1,2,5,6-tetrahydropyridine,
N-[$\epsilon$-(p-phenoxybenzoyl)-pentyl]-4-phenyl-1,2,5,6-tetrahydropyridine,
N-[$\alpha$-(p-phenoxybenzoyl)-propyl]-4-phenyl-1,2,5,6-tetrahydropyridine,
N-[$\beta$-(p-phenoxybenzoyl)-propyl]-4-phenyl-1,2,5,6-tetrahydropyridine,
N-[$\beta$-(o-chloro-p-phenoxybenzoyl)-ethyl]-4-phenyl-1,2,5,6-tetrahydropyridine,
N-[$\beta$-(m-bromo-p-phenoxybenzoyl)-ethyl]-4-phenyl-1,2,5,6-tetrahydropyridine,
N-[$\beta$-(o,m-methylenedioxy-p-phenoxybenzoyl)-ethyl]-4-phenyl-1,2,5,6-tetrahydropyridine,
N-[$\beta$-(m-nitro-p-phenoxybenzoyl)-ethyl]-4-phenyl-1,2,5,6-tetrahydropyridine,
N-[$\beta$-(m-trifluoromethyl-p-phenoxybenzoyl)-ethyl]-4-phenyl-1,2,5,6-tetrahydropyridine,
N-[$\beta$-(o-amino-p-phenoxybenzoyl)-ethyl]-4-phenyl-1,2,5,6-tetrahydropyridine,
N-[$\beta$-(p-4-chlorophenoxybenzoyl)-ethyl]-4-phenyl-1,2,5,6-tetrahydropyridine,
N-[$\beta$-(p-3-iodophenoxybenzoyl)-ethyl]-4-phenyl-1,2,5,6-tetrahydropyridine,
N-[$\beta$-(p-4-trifluoromethylphenoxybenzoyl)-ethyl]-4-phenyl-1,2,5,6-tetrahydropyridine,
N-[$\beta$-(p-2-bromophenoxybenzoyl)-ethyl]-4-phenyl-1,2,5,6-tetrahydropyridine,
N-[$\beta$-p-4-methoxyphenoxybenzoyl)-ethyl]-4-phenyl-1,2,5,6-tetrahydropyridine,
N-[$\beta$-(p-4-methylphenoxybenzoyl)-ethyl]-4-phenyl-1,2,5,6-tetrahydropyridine,
N-[$\beta$-(o-chloro-p-4-chlorophenoxybenzoyl)-ethyl]-4-phenyl-1,2,5,6-tetrahydropyridine and
N-[$\beta$-(o-trifluoromethyl-p-4-chlorophenoxybenzoyl)-ethyl]-4-phenyl-1,2,5,6-tetrahydropyridine, respectively.

Example 30

When, in the procedure of Example 4, N-[2-(p-phenoxybenzoyl)-ethyl]-4-phenyl-1,2,5,6-tetrahydropyridine is replaced by an equal molar amount of each of the products of Example 29, there are obtained, N-[2-hydroxy-2-(p-phenoxyphenyl)-ethyl]-4-phenyl-1,2,5,6-tetrahydropyridine,
N-[5-hydroxy-5-(p-phenoxyphenyl)-pentyl]-4-phenyl-1,2,5,6-tetrahydropyridine,
N-[6-hydroxy-6-(p-phenoxyphenyl)-hexyl]-4-phenyl-1,2,5,6-tetrahydropyridine,
N-[1-ethyl-2-hydroxy-2-(p-phenoxyphenyl)-ethyl]-4-phenyl-1,2,5,6-tetrahydropyridine,
N-[1-methyl-3-hydroxy-3-(p-phenoxyphenyl)-propyl]-4-phenyl-1,2,5,6-tetrahydropyridine,
N-[3-hydroxy-3-(o-chloro-p-phenoxyphenyl)-propyl]-4-phenyl-1,2,5,6-tetrahydropyridine,
N-[3-hydroxy-3-(m-bromo-p-phenoxyphenyl)-propyl]-4-phenyl-1,2,5,6-tetrahydropyridine,
N-[3-hydroxy-3-(o,m-methylenedioxy-p-phenoxyphenyl)-propyl]-4-phenyl-1,2,5,6-tetrahydropyridine,
N-[3-hydroxy-3-(m-nitro-p-phenoxyphenyl)-propyl]-4-phenyl-1,2,5,6-tetrahydropyridine,
N-[3-hydroxy-3-(m-trifluoromethyl-p-phenoxyphenyl)-propyl]-4-phenyl-1,2,5,6-tetrahydropyridine,
N-[3-hydroxy-3-(o-amino-p-phenoxyphenyl)-propyl]-4-phenyl-1,2,5,6-tetrahydropyridine,
N-[3-hydroxy-3-(p-4-chlorophenoxyphenyl)-propyl]-4-phenyl-1,2,5,6-tetrahydropyridine,
N-[3-hydroxy-3-(p-3-iodophenoxyphenyl)-propyl]-4-phenyl-1,2,5,6-tetrahydropyridine,
N-[3-hydroxy-3-(p-4-trifluoromethylphenoxyphenyl)-propyl]-4-phenyl-1,2,5,6-tetrahydropyridine,
N-[3-hydroxy-3-(p-2-bromophenoxyphenyl)-propyl] 4-phenyl-1,2,5,6-tetrahydropyridine,
N-[3-hydroxy-3-(p-4-methoxyphenoxyphenyl)-propyl]-4-phenyl-1,2,5,6-tetrahydropyridine,
N-[3-hydroxy-3-(p-4-methylphenoxyphenyl)-propyl]-4-phenyl-1,2,5,6-tetrahydropyridine,
N-[3-hydroxy-3-(o-chloro-p-4-chlorophenoxyphenyl)-propyl]-4-phenyl-1,2,5,6-tetrahydropyridine and
N-[3-hydroxy-3-(o-trifluoromethyl-p-4-chlorophenoxyphenyl)-propyl]-4-phenyl-1,2,5,6-tetrahydropyridine, respectively.

Example 31

When, in the procedure of Example 6, butyl isocyanate is replaced by an equal molar amount of ethylisocyanate,
propylisocyanate and
isocyanic acid, there are obtained, 3-(4-phenyl-1,2,5,6-tetrahydropyridino)-1-(p-phenoxyphenyl)-1-propanol-N-ethylcarbamate,
3-(4-phenyl-1,2,5,6-tetrahydropyridino)-1-(p-phenoxyphenyl)-1-propanol-N-propylcarbamate and
3-(4-phenyl-1,2,5,6-tetrahydropyridino)-1-(p-phenoxyphenyl)-1-propanol carbamate, respectively.

21

Example 32.—Preparation of γ-(4-phenyl-1,2,5,6-tetrahydropyridino)-α-(p-phenoxyphenyl)propane N-[β-(p - phenoxybenzoyl) - ethyl - 4 - phenyl - 1,2,5,6-tetrahydropyridine-2-naphthalene sulfonate is treated with hydrazine in ethylene glycol (Wolff-Kishner reaction) to give γ-(4-phenyl-1,2,5,6-tetrahydropyridino) - α-(p-phenoxyphenyl)-propane.

Example 33

When, in the procedure of Example 17, N-(o-methoxyphenyl)piperazine dihydrochloride is replaced by an equal molar amount of N-phenylpiperazine,
N-methylpiperazine,
N-ethylpiperazine,
N-p-chlorophenylpiperazine,
N-p-fluorophenylpiperazine and
N-p-trifluoromethylphenylpiperazine, there are obtained, 1-phenyl-4-[β-(p-phenoxybenzoly)-ethyl]-piperazine,
1-methyl-4-[β-(p-phenoxybenzoyl)-ethyl]-piperazine,
1-ethyl-4-[β(p-phenoxybenzoyl)-ethyl]-piperazine,
1-(p-chlorophenyl)-4-[β-(p-phenoxybenzoyl)-ethyl]-piperazine,
1-(p-fluorophenyl)-4-[β-p-phenoxybenzoyl)-ethyl]-piperazine and
1-(p-trifluoromethylphenyl)-4-[β-(phenoxybenzoyl)-ethyl]-piperazine, respectively.

Example 34

When, in the procedure of Example 19, 1-[γ-(p-phenoxybenzoyl) - propyl] - 4 - (o-methoxyphenyl)-piperazine is replaced by an equal molar amount of each of the products of Example 33, there are obtained, 4-phenylpiperazino-1-(p-phenoxyphenyl)-1-butanol,
4-methylpiperazino-1-(p-phenoxyphenyl)-1-butanol,
4-ethylpiperazino-1-(p-phenoxyphenyl)-1-butanol,
4-(p-chlorophenylpiperazino)-1-(p-phenoxyphenyl)-1-butanol,
4-(p-fluorophenylpiperazino)-1-(p-phenoxyphenyl)-1-butanol and
4-(p-trifluoromethylphenylpiperazino)-1-(p-phenoxyphenyl)-1-butanol, respectively.

While this invention has been described in terms of its preferred embodiment, those skilled in the art will appreciate that modifications can be made without departing from the spirit and scope of the foregoing invention.

What is claimed is:

1. A compound selected from the group consisting of a compound of the formula

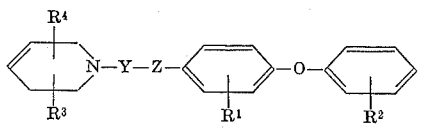

wherein:

R¹ and R² each represent a member selected from the group consisting of hydrogen, chloro, bromo, iodo, fluoro, trifluoromethyl, lower alkyl, lower alkoxy, methylenedioxy, nitro and amino;

R³ and R⁴ each represent a member selected from the group consisting of hydrogen, lower alkyl, hydroxy, lower alkynyl, lower alkoxy carbonyl, cycloalkyl radicals having from 3 to 7 carbon atoms, inclusive, phenyl, halophenyl, trifluoromethylphenyl, lower alkoxy phenyl and lower alkyl phenyl;

Y is lower alkylene; and

Z is a member selected from the group consisting of

22

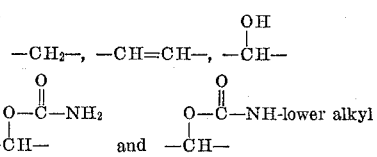

and the pharmaceutically acceptable nontoxic salts thereof.

2. A compound selected from the group consisting of compounds of the formula

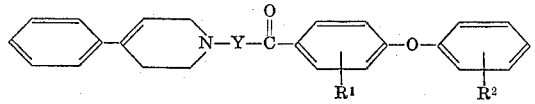

wherein:

R¹ and R² each represent a member selected from the group consisting of hydrogen, chloro, bromo, iodo, fluoro, trifluoromethyl, lower alkyl, lower alkoxy, methylenedioxy, nitro and amino; and Y is lower alkylene.

3. A compound selected from the group consisting of compounds of the formula

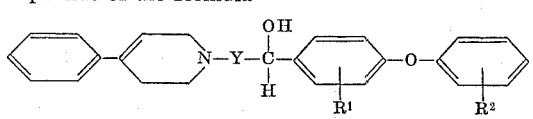

wherein:

R¹ and R² each represent a member selected from the group consisting of hydrogen, chloro, bromo, iodo, fluoro, trifluoromethyl, lower alkyl, lower alkoxy, methylenedioxy, nitro and amino; and Y is lower alkylene.

4. A compound selected from the group consisting of compounds of the formula

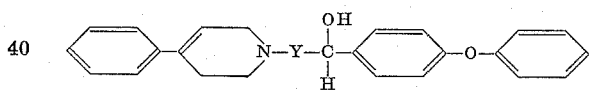

wherein Y is lower alkylene.

5. A compound selected from the group consisting of compounds of the formula

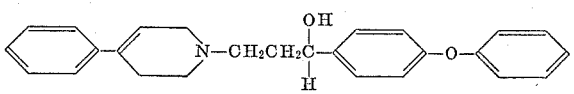

6. A compound selected from the group consisting of compounds of the formula

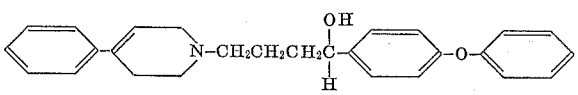

7. A compound selected from the group consisting of compounds of the formula

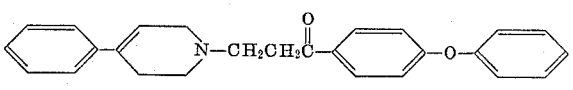

References Cited

UNITED STATES PATENTS 2,973,365   2/1961   Janssen _____ 260—297

HENRY R. JILES, *Primary Examiner.*

A. L. ROTMAN, *Assistant Examiner.*

U.S. Cl. X.R.

260—240, 268, 293.4, 294.3, 294.7, 294.8, 295, 296, 297, 326.3, 326.5, 999